US011561052B2

(12) United States Patent
Martini et al.

(10) Patent No.: US 11,561,052 B2
(45) Date of Patent: Jan. 24, 2023

(54) HEAT EXCHANGER AND METHOD OF OPERATING A HEAT EXCHANGER

(71) Applicant: Hanon Systems, Daejeon (KR)

(72) Inventors: Joerg Martini, Pulheim (DE); Christoph Pauls, Bergheim (DE)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 17/189,138

(22) Filed: Mar. 1, 2021

(65) Prior Publication Data

US 2021/0278149 A1    Sep. 9, 2021

(30) Foreign Application Priority Data

Mar. 5, 2020  (DE) .......................... 102020202835.4

(51) Int. Cl.
*F28F 9/24* (2006.01)
*F28F 3/04* (2006.01)
*F28F 27/02* (2006.01)
*F28F 9/02* (2006.01)

(52) U.S. Cl.
CPC .............. *F28F 9/24* (2013.01); *F28F 3/044* (2013.01); *F28F 9/0202* (2013.01); *F28F 27/02* (2013.01); *F28F 2215/00* (2013.01); *F28F 2250/08* (2013.01); *F28F 2250/102* (2013.01)

(58) Field of Classification Search
CPC .. F28F 9/24; F28F 9/0202; F28F 3/044; F28F 27/02; F28F 2215/00; F28F 2250/08; F28F 2250/102
See application file for complete search history.

(56) References Cited

U.S. PATENT DOCUMENTS

| | | | |
|---|---|---|---|
| 8,485,247 B2 * | 7/2013 | Lavric ................. | B01J 19/0093 165/181 |
| 10,548,240 B1 * | 1/2020 | Iyengar ............. | H05K 7/20254 |
| 2015/0122467 A1 * | 5/2015 | Shi ......................... | F28F 3/048 165/166 |
| 2017/0198983 A1 * | 7/2017 | Somhorst ................. | F28F 1/10 |
| 2017/0347487 A1 * | 11/2017 | Rudnicki ............... | F28F 13/12 |
| 2019/0110374 A1 | 4/2019 | Harrington | |
| 2019/0110375 A1 * | 4/2019 | Harrington ............. | F04C 14/04 |
| 2020/0072561 A1 * | 3/2020 | Eijima .................. | F28F 9/0075 |
| 2020/0080796 A1 * | 3/2020 | Dasgupta ................ | F01D 25/12 |

FOREIGN PATENT DOCUMENTS

| | | |
|---|---|---|
| CN | 102564176 A | 7/2012 |
| CN | 105190002 A | 12/2015 |
| CN | 106225529 A | 12/2016 |
| CN | 106568340 A | 4/2017 |
| DE | 102012109625 A1 | 5/2013 |
| DE | 102016102848 A1 | 8/2016 |

(Continued)

*Primary Examiner* — Devon Russell
(74) *Attorney, Agent, or Firm* — Shumaker, Loop & Kendrick, LLP; James D. Miller

(57) ABSTRACT

A heat exchanger has flow channels for coolants, which flow channels include turbulence elements having a different flow resistance depending on a direction of a flow, wherein the flow can be passed through the heat exchanger in different directions. As part of a method of operating the heat exchanger, the heat exchanger is flowed through in different directions using a pump that can be operated in different directions.

11 Claims, 5 Drawing Sheets

(56) References Cited

FOREIGN PATENT DOCUMENTS

| | | | |
|---|---|---|---|
| DE | 102016226332 A1 | | 7/2017 |
| KR | 101273440 B1 | * | 6/2013 |
| KR | 20150084262 A | | 7/2015 |
| KR | 20170115898 A | | 10/2017 |
| WO | WO-2019188997 A1 | * | 10/2019 ........... B23K 1/0012 |

* cited by examiner

HEAT EXCHANGER AND METHOD OF OPERATING A HEAT EXCHANGER

CROSS REFERENCE TO RELATED APPLICATIONS

This patent application claims the benefit of German Patent Application No. DE 10 2020 202 835.4 filed on Mar. 5, 2020, the entire disclosure of which is hereby incorporated herein by reference.

TECHNICAL FIELD

The invention relates to a heat exchanger, in particular for use in an automobile for cooling a coolant, as well as to a method of operating a heat exchanger.

PRIOR ART

Heat exchangers are used in particular in automobiles in the front area of the vehicle to cool a coolant by means of the air flowing through. Cooling the interior of a vehicle can be ensured by means of an interconnected heat pump and a separate circuit. In electric or hybrid vehicles, cooling of the battery can additionally take place. Here, the case may arise that the battery has to be heated in certain operating conditions, and thus the coolant has to pass through the heat exchanger at extremely low temperatures due to the extraction of thermal energy in the interposed heat pump. In this case, the coolant in the heat exchanger must absorb heat energy, which is possible comparatively inefficiently due to the associated high viscosity. This applies in particular in view of turbulence elements present in the flow channels provided for the coolant in the heat exchanger to increase the turbulences. This may be advantageous for comparatively high coolant temperatures, which can reach up to 135° C. However, it is unfavorable for comparatively low coolant temperatures, which can reach as low as −30° C.

DESCRIPTION OF THE INVENTION

Against this background, the invention is based on the object of providing a heat exchanger that can be operated efficiently over a wide temperature range, as well as a method of operating the heat exchanger.

This object is solved firstly by the heat exchanger as disclosed herein.

The heat exchanger accordingly has flow channels for coolants, which flow channels comprise turbulence elements having a different flow resistance depending on the direction of flow. According to the invention, the coolant flow can be passed through the heat exchanger in different directions. As a result of this, the generation of turbulence can be varied essentially by changing the direction of flow and, in particular, the viscosity of the coolant present at a given time can be adapted.

In other words, as described in more detail below, provisions are made to pass the coolant at a comparatively high viscosity through the flow channels of the heat exchanger such that there is a comparatively low flow resistance. Moreover, the reduction in turbulence associated therewith advantageously results in that the pressure loss and the energy consumption of a pump used for this purpose is kept low. In contrast, in the case of a comparatively low viscosity, the coolant is passed through the flow channels in such a way that large turbulence is generated, and heat transfer is improved.

As will also be explained in more detail below, turbulence elements are understood to mean any elements or structures that generate turbulence in the coolant. It is, in principle, conceivable to provide movable elements in the heat exchanger such that the orientation of the turbulence elements is changed with respect to the flow and, thus, in other words, the coolant can be passed through the heat exchanger in different directions with respect to the turbulence elements. However, as will be described in greater detail below, it is preferred to avoid movable elements inside the heat exchanger and to essentially change the flow direction by measures provided outside the heat exchanger.

The turbulence elements can, for example, be drop- or triangle-shaped in top view. What is called Chevron plates can be used here in a heat exchanger which is essentially configured in the form of stacked plates with intermediate channels for the coolant or the cooling air.

Alternatively, in certain applications, undulatory turbulence elements are advantageous which can in particular be configured as fines or lamellas. The waves can be configured comparatively round as well as comparatively angular. In other words, in a flow channel, which can have a surface extension and a certain height, one or more sheet-metal strips, bent into a waveform, are provided between the height-defining plates and are preferably connected to these plates on one or both sides, for example in a soldered manner.

A plurality of wave-shaped fins that are offset from one another have proven to be particularly advantageous. In this case, several comparatively narrow sheet metal strips are provided which are offset from one another such that the wave crests are offset from one another, for example, by half a wavelength.

For changing the direction of flow, it is advantageous to provide at least two inlets and/or outlets in order to switch between the inlets and/or outlets by means of suitable measures, thereby realizing different flow directions.

In particular in this context, it is further preferred that at least one valve is present at the heat exchanger according to the invention. This allows, according to one particularly preferred measure, to steplessly switch between two inlets and/or outlets, and thus the prevailing flow direction can also be steplessly adjusted. Alternatively or additionally, the valve can be provided such that the flow direction can be reversed between each one of the existing inlet and outlet. In particular applications, this measure can be provided for two inlets and/or outlets.

Essentially, as an alternative to the previously described configuration with at least two inlets and/or outlets, one embodiment is conceivable in which the heat exchanger according to the invention is combined with a pump that can be operated in two directions. Thus, if there is only one inlet and one outlet, the coolant can be passed through the heat exchanger in two different directions by the inlet becoming the outlet and the outlet becoming the inlet.

The above-mentioned object is solved secondly by a method of operating a heat exchanger, in which the coolant is passed through the heat exchanger in different directions. In accordance with the preferred embodiments of the heat exchanger described above, stepless adjustment of the flow direction can be advantageously provided. Preferably, alternatively, a pump can be operated in two directions. It should be mentioned that all the preceding and following features of a heat exchanger are applicable to the method according to the invention and vice versa.

BRIEF DESCRIPTION OF THE DRAWINGS

In the following, the invention will be described in more detail on the basis of preferred embodiment examples with reference to the drawings. The drawings show the following.

DETAILED DESCRIPTION OF PREFERRED EMBODIMENTS OF THE INVENTION

Figure 1:
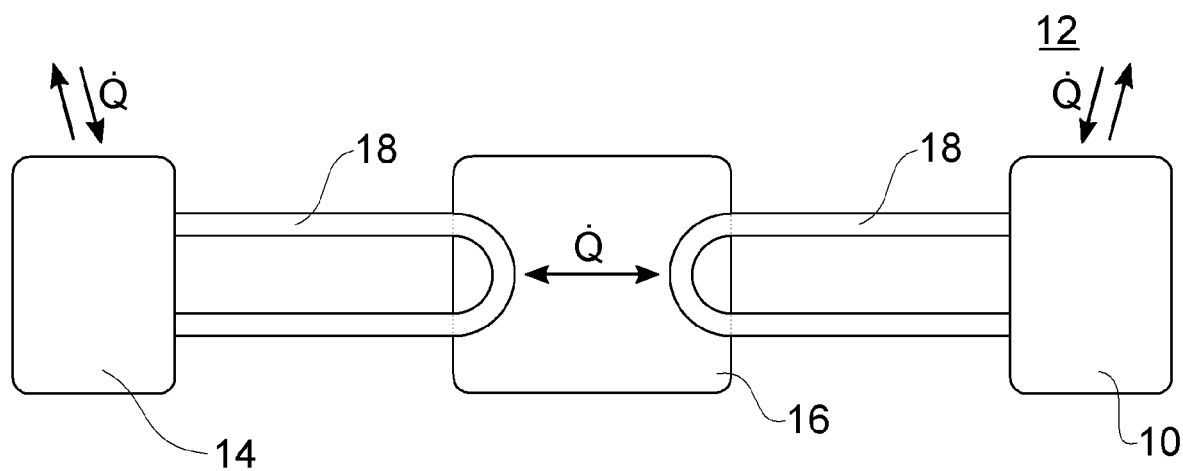
FIG. 1 the basic structure of the cooling and heating circuits in an automobile.

As shown in FIG. 1, an air-conditioning system 10 is typically used in an automobile to cool or heat the interior 12 of the vehicle. If there is an electric or hybrid vehicle, the battery can additionally be cooled or heated. Between the air-conditioning system 10 and a heat exchanger 14 provided for receiving or releasing thermal energy to the environment depending on the operating condition, there is interposed a heat pump 16 which is connected to the heat exchanger 14 and the air-conditioning system 10 by suitable circuits 18 and 20, respectively.

Figure 2:
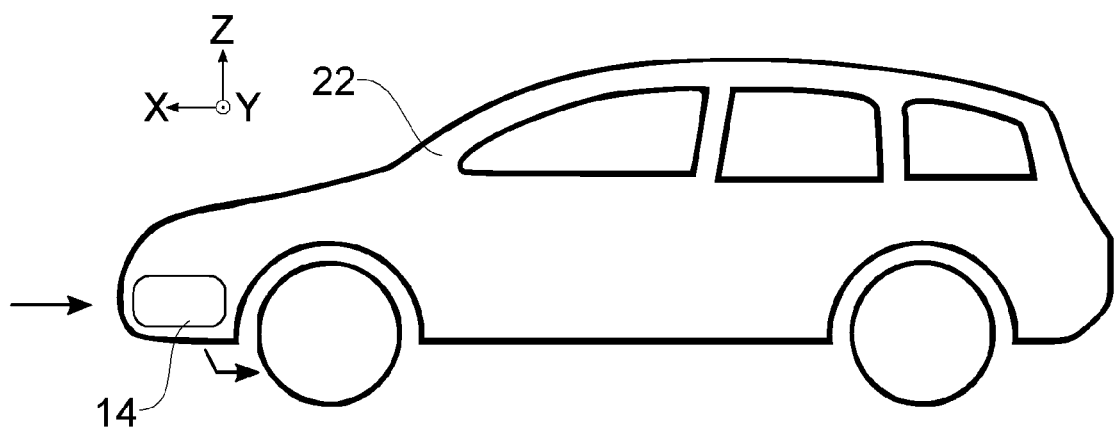
FIG. 2 the typical arrangement of the heat exchanger according to the invention in an automobile.

FIG. 2 shows the typical position of the heat exchanger 14 in an automobile 22. This position is typically in the front area of the vehicle so that, for example, heat can be absorbed even at comparatively low ambient temperatures down to minus degrees if the coolant has an even lower temperature.

Figure 3:
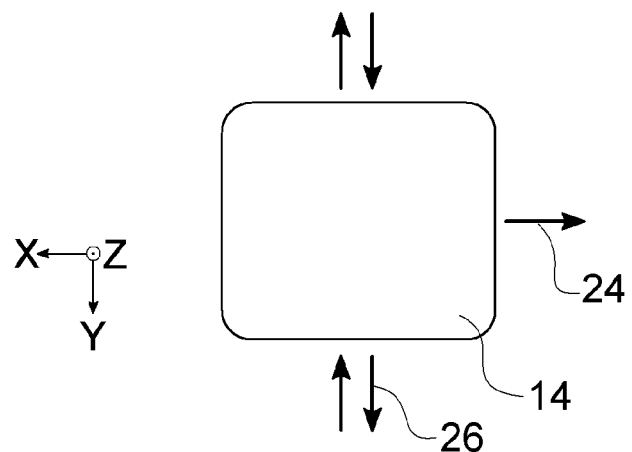
FIG. 3 a schematic top view of the heat exchanger.

FIG. 3 shows a schematic top view of the heat exchanger 14, from which it is apparent that it is typically a cross-flow heat exchanger in which the flow direction 24 of the air is substantially perpendicular to the flow direction 26 of the coolant.

Figure 4:
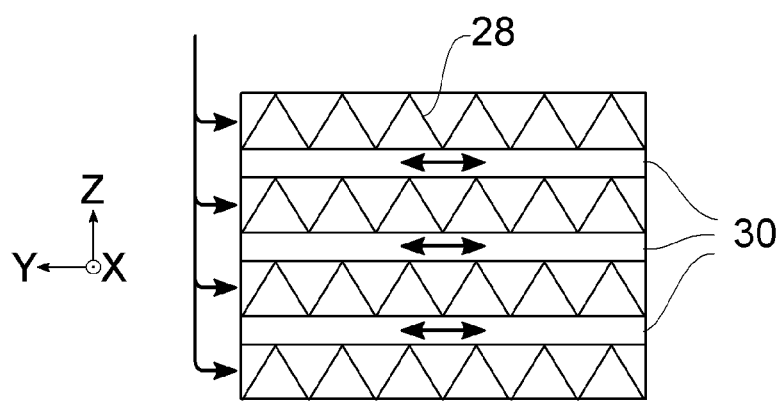
FIG. 4 a schematic side view of the heat exchanger.

As can be seen in the additional side view of FIG. 4, the flow channels for air, which according to FIG. 4 extend perpendicular to the drawing plane, can have undulatory fins 28 to improve heat transfer. As can also be seen in FIG. 4, the flow channels for air are stacked with the flow channels 30 for coolant and are substantially delimited by plates.

As described in more detail below with reference to FIG. 10, the flow channels for the coolant substantially extend between two distributors, into which the coolant initially flows and from which it flows out after passing through the flow channels 30.

Figure 5:
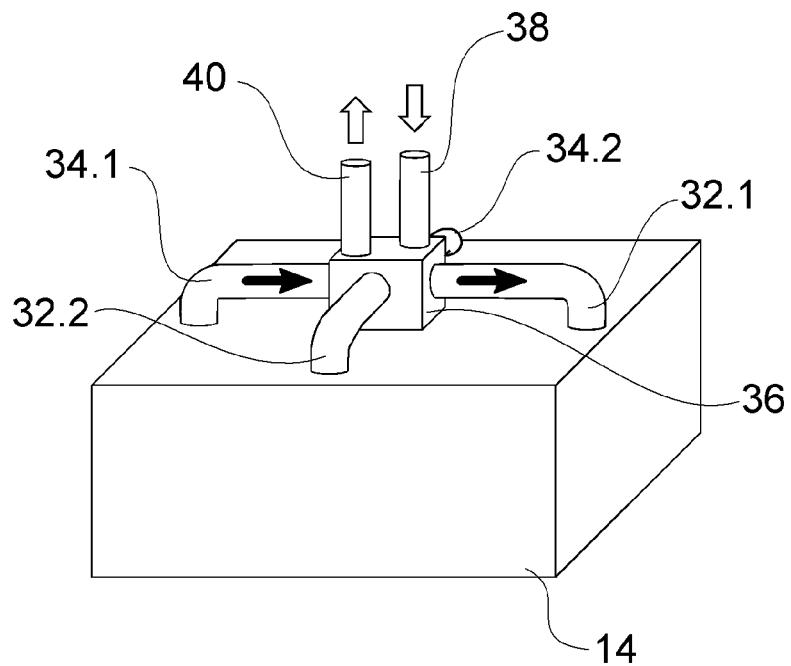
FIG. 5 a schematic perspective view of the heat exchanger with a first flow direction.

As can be seen in FIG. 5, the heat exchanger 14 according to the invention, which is shown in perspective view and which in this case is cubic, can have two inlets 32.1, 32.2 and two outlets 34.1 and 34.2. Accordingly, such a heat exchanger 14 typically has distributors on all four sides.

As now shown in FIG. 5, a first flow direction extends from the first inlet 32.1 to the first outlet 34.1. For this purpose, as can be seen in the upper section of FIG. 5, the coolant is passed from the supply line 38 through a suitable line to the inlet 32.1 by means of, for example, a soldered-on valve 36, and the coolant coming from the outlet 34.1 is discharged through a further suitable line to the discharge line 40 and through the latter.

Figure 6:
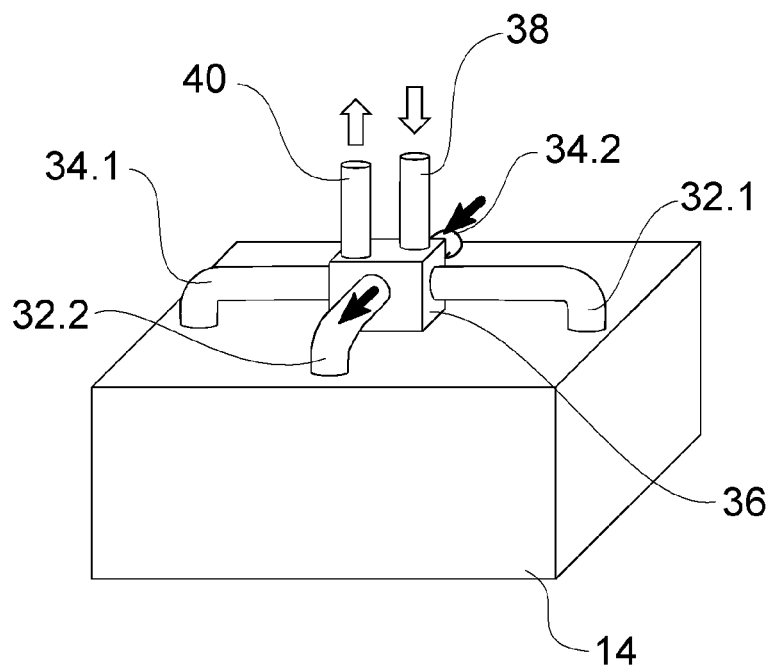
FIG. 6 a schematic perspective view of the heat exchanger with a second flow direction.

This applies analogously to the situation shown in FIG. 6. Here, however, the valve 36 is connected such that the coolant is passed to the second inlet 32.2 and is discharged again through the second outlet 34.2. Accordingly, the two flow directions are substantially perpendicular to each other, as can be seen more precisely in FIG. 9. Furthermore, by a suitable switching of the valve 36 for a stepless distribution to the two inlets 32, the amount of inflowing coolant can each be regulated, with the result that random directions C between the two flow directions A, B drawn in FIG. 9 can be set in the heat exchanger, i.e. between, firstly, the first inlet and outlet and, secondly, the second inlet and outlet. It should additionally be mentioned that a similar effect can be achieved if the heat exchanger 14 in top view is not rectangular, as shown, but is substantially triangle shaped and has two inlets or two outlets. In this case as well, a distribution can be made between the two inlets or outlets in the above-described manner, and the flow direction can be substantially steplessly adjusted.

Figure 7:
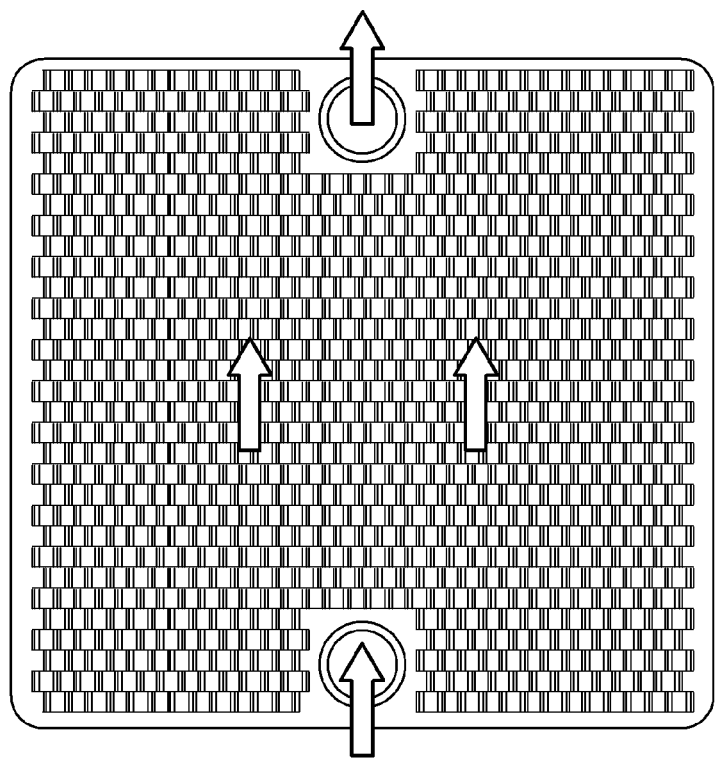
FIG. 7 a top view of a plate of the heat exchanger.
Figure 8:
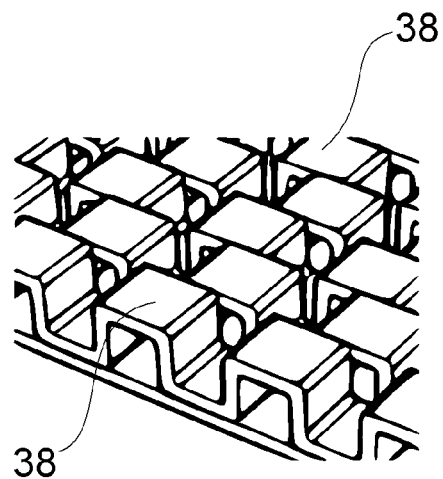
FIG. 8 one detail of the plate shown in FIG. 7.

In FIG. 7, only one flow direction is shown which, however, can be reversed, and the detailed view of FIG. 8 shows the configuration with undulatory fins 38 that are offset from one another, which in the case shown are comparatively angular in shape. A comparatively low flow resistance results if the heat exchanger is flowed through according to the arrows in FIG. 7, i.e. based on FIG. 8 from bottom left to top right. In contrast hereto, a flow according to FIG. 8, i.e. from bottom right to top left or vice versa, results in a significantly higher flow resistance.

Figure 9:
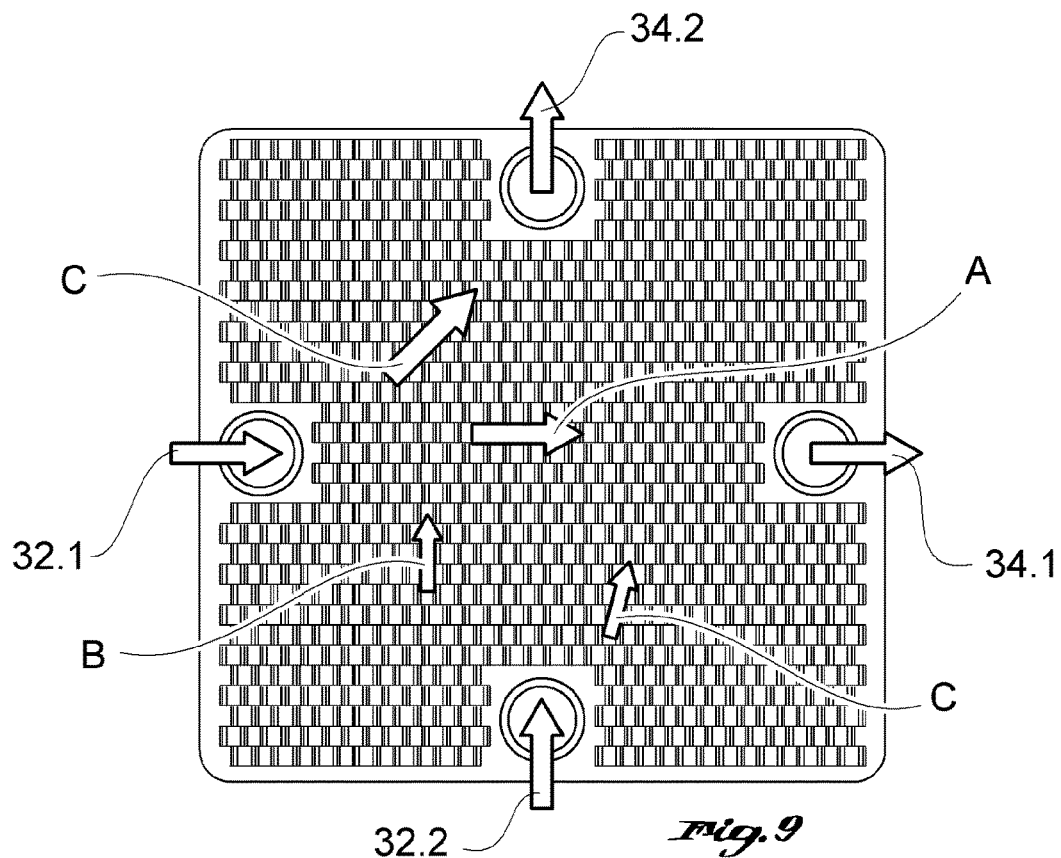
FIG. 9 a top view of the plate according to FIG. 7 in a further embodiment.

The latter case corresponds to the case shown in FIG. 9 of a flow from left to right, i.e. from the first inlet 32.1 to the first outlet 34.1 and in the direction of arrow A. Perpendicular to this, substantially in the direction of arrow B and from the second inlet 32.2 to the second outlet 34.2, there is significantly lower flow resistance. As indicated by arrows C, distributing the coolant to the two inlets 32 allows "oblique" flow directions with an accordingly adjusted flow resistance to be shown in any desired manner due to the presence of fins 38.

Figure 10:
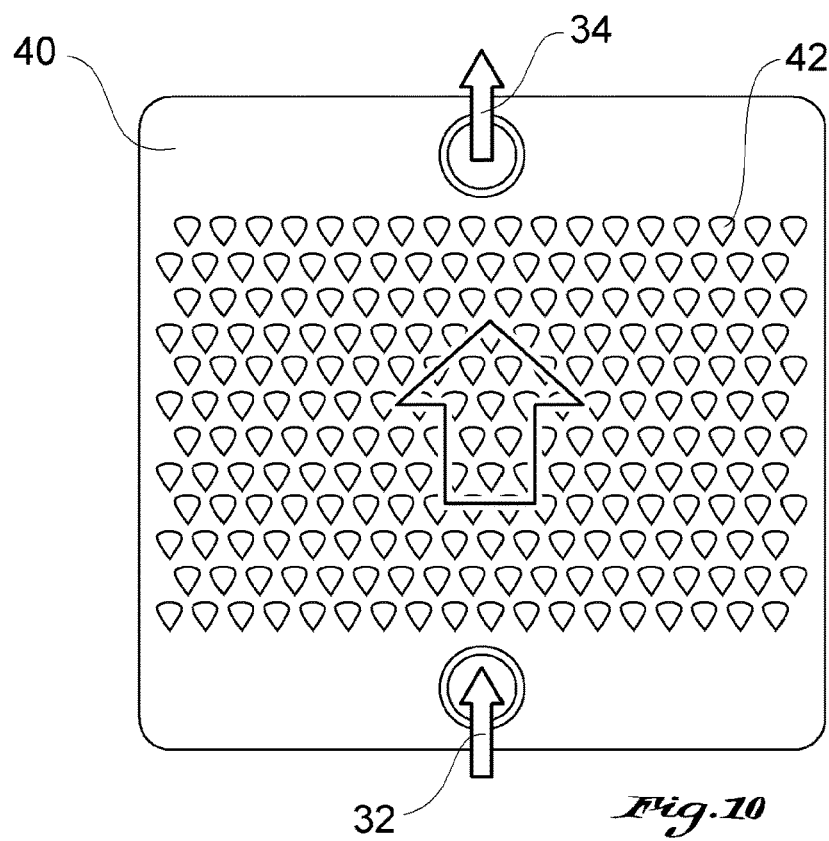
FIG. 10 an alternative plate of the heat exchanger according to the invention.

FIG. 10 schematically shows an alternative plate 40 that can be used in the heat exchanger 14 according to the invention and is referred to as a Chevron plate. The Chevron plate comprises what is called dimple turbulence elements substantially in the form of numerous indentations or bulges which, due to their drop or triangle shape, have a different flow resistance depending on the flow direction, as can be seen in FIG. 10. In particular, in the case shown, the flow resistance is lower when the flow is from bottom to top than with a reverse direction of flow. In this case, the flow direction can be ensured by a valve similar to that shown in FIGS. 5 and 6 if this valve can be switched such that it reverses the flow direction. Alternatively, this can be done by a suitable pump.

In FIG. 10, strip-shaped edge regions can be seen in the area of the inlet 32 and outlet 34, which do not have any turbulence elements 42. These edge regions correspond to the flow distributors mentioned above, and thus multiple flow channels can be flowed through between plates in the desired direction, as shown in FIGS. 7, 9 and 10.

It is additionally mentioned that the heat exchanger according to the invention can also be flowed through by a coolant.

What is claimed is:

1. A heat exchanger comprising:
   flow channels for a coolant, the flow channels further comprising:
   turbulence elements having a different flow resistance depending on a direction of a flow of the coolant, wherein the flow of the coolant can be passed through the heat exchanger in different directions, and
   a plurality of flow openings with each of the flow openings forming an inlet or an outlet of the heat exchanger depending on the direction the flow of the coolant is passed through the heat exchanger, wherein the heat exchanger further comprises at least one valve, and wherein the at least one valve switches the flow of the coolant between the plurality of flow openings to change the direction in which the flow of the coolant is passed through the heat exchanger, wherein the coolant at a comparatively high viscosity is passed through the flow channels of the heat exchanger such that there is a comparatively lower flow resistance and the coolant at a comparatively low viscosity is passed through the flow channels such that there is a comparatively higher flow resistance.

2. The heat exchanger according to claim 1, wherein the turbulence elements are drop and triangle-shaped in a top view.

3. The heat exchanger according to claim 1, wherein the turbulence elements are undulatory fins.

4. The heat exchanger according to claim 3, wherein a plurality of the undulatory fins is provided offset from one another.

5. The heat exchanger according to claim 1, wherein the heat exchanger is in fluid communication with a pump that can be operated in two directions.

6. The heat exchanger according to claim 5, wherein the pump is operated in a first direction when the coolant is at the comparatively high viscosity and wherein the pump is operated in a second direction when the coolant is at the comparatively low viscosity.

7. The heat exchanger according to claim 1, wherein the at least one valve is adjusted to switch the flow of the coolant between the plurality of the flow openings according to the viscosity of the coolant.

8. The heat exchanger according to claim 1, wherein the plurality of the flow openings includes at least one inlet and at least one outlet, at least two inlets and at least one outlet, or at least one inlet and at least two outlets.

9. The heat exchanger according to claim 1, wherein a configuration of the at least one valve determines which of the plurality of the flow openings acts as one of the inlets of the heat exchanger or one of the outlets of the heat exchanger.

10. The heat exchanger according to claim 1, wherein an adjustment of the at least one valve switches at least one of the plurality of the flow openings from acting as one of the inlets of the heat exchanger to acting as one of the outlets of the heat exchanger to change the direction in which the flow of the coolant is passed through the heat exchanger.

11. The heat exchanger according to claim 1, wherein an adjustment of the at least one valve switches at least one of the plurality of the flow openings from acting as one of the outlets of the heat exchanger to acting as one of the inlets of the heat exchanger to change the direction in which the flow of the coolant is passed through the heat exchanger.

* * * * *